United States Patent
Fang (10) Patent No.: US 9,760,201 B2
(45) Date of Patent: Sep. 12, 2017

(54) OPERATION CONTROL METHOD FOR TOUCHSCREEN TERMINAL, AND MOBILE TERMINAL

(71) Applicant: ZTE CORPORATION, Guangdong (CN)

(72) Inventor: Wen Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/414,175

(22) PCT Filed: Jun. 24, 2013

(86) PCT No.: PCT/CN2013/077731
§ 371 (c)(1),
(2) Date: Jan. 12, 2015

(87) PCT Pub. No.: WO2013/185646
PCT Pub. Date: Dec. 19, 2013

(65) Prior Publication Data
US 2015/0212640 A1  Jul. 30, 2015

(30) Foreign Application Priority Data
Jul. 12, 2012  (CN) .......................... 2012 1 0241259

(51) Int. Cl.
*G06F 3/041*   (2006.01)
*G06F 3/0488*  (2013.01)
(Continued)

(52) U.S. Cl.
CPC .......... *G06F 3/0416* (2013.01); *G06F 3/0412* (2013.01); *G06F 3/0484* (2013.01);
(Continued)

(58) Field of Classification Search
CPC ........ G06F 21/629; G06F 21/83; G06F 21/82; G06F 3/0484; G06F 3/0412; G06F 3/0416; G06F 3/0488; G06F 21/31
(Continued)

(56) References Cited

U.S. PATENT DOCUMENTS

2005/0079896 A1* 4/2005 Kokko ................... G06F 3/0488
455/566
2005/0181821 A1* 8/2005 Elomaa ............... H04M 1/7258
455/550.1
(Continued)

FOREIGN PATENT DOCUMENTS

CN  1735247 A  2/2006
CN  1893710 A  1/2007
(Continued)

OTHER PUBLICATIONS

International Search Report of PCT/CN2013/077731, dated Oct. 3, 2013.
(Continued)

*Primary Examiner* — Adam R Giesy
*Assistant Examiner* — Chineyere Wills-Burns
(74) *Attorney, Agent, or Firm* — Banner & Witcoff, Ltd.

(57) ABSTRACT

Provided are an operation control method for a touchscreen terminal and a mobile terminal. The method includes: a mobile terminal entering into an operation type locked state under a specified condition; and after detecting a specified type of operation, the mobile terminal prohibiting any response to the specified type of operation. With the embodiments of the present document, it is to enable the user, when using the mobile terminal, to not only obtain the same effect of preventing incorrect touch or operation as that of screen locking, but also not to be blocked by an unnecessary locked screen interface when needing to read the contents in the
(Continued)

standby interface, thus simplifying the user operation, and enhancing the operation experience of the mobile terminal.

10 Claims, 4 Drawing Sheets

(51) Int. Cl.
    *G06F 3/0484* (2013.01)
    *G06F 21/31* (2013.01)
    *G06F 21/82* (2013.01)
    *G06F 21/62* (2013.01)
    *G06F 21/83* (2013.01)

(52) U.S. Cl.
    CPC ............ *G06F 3/0488* (2013.01); *G06F 21/31* (2013.01); *G06F 21/629* (2013.01); *G06F 21/82* (2013.01); *G06F 21/83* (2013.01)

(58) Field of Classification Search
    USPC .......................................................... 345/173
    See application file for complete search history.

(56) References Cited

U.S. PATENT DOCUMENTS

| | | |
|---|---|---|
| 2006/0012577 A1 | 1/2006 | Kyrola |
| 2007/0150842 A1* | 6/2007 | Chaudhri ............ G06F 3/04883 715/863 |
| 2009/0036100 A1 | 2/2009 | Lee |
| 2010/0001967 A1* | 1/2010 | Yoo ..................... G06F 3/0488 345/173 |
| 2010/0162182 A1 | 6/2010 | Oh et al. |
| 2010/0248688 A1 | 9/2010 | Teng et al. |
| 2011/0047368 A1* | 2/2011 | Sundaramurthy .... G06F 3/0481 713/100 |
| 2011/0105193 A1* | 5/2011 | Lee ....................... G06F 3/0488 455/566 |
| 2012/0084691 A1 | 4/2012 | Yun |
| 2012/0151400 A1* | 6/2012 | Hong .................. G06F 3/04817 715/769 |
| 2012/0311499 A1* | 12/2012 | Dellinger ........... H04N 5/23206 715/835 |

FOREIGN PATENT DOCUMENTS

| | | |
|---|---|---|
| CN | 1921672 A | 2/2007 |
| CN | 101625620 A | 1/2010 |
| CN | 101958973 A | 1/2011 |
| CN | 102495768 A | 6/2012 |
| CN | 102779013 A | 11/2012 |
| JP | 2005190335 A | 7/2005 |
| JP | 2009230295 A | 10/2009 |
| JP | 2012049872 A | 3/2012 |
| KR | 20090025563 A | 3/2009 |
| WO | 2010/050154 A1 | 5/2010 |
| WO | 2011028458 A2 | 3/2011 |

OTHER PUBLICATIONS

Japanese Office Action of Application No. 2015-520805, dated Feb. 22, 2016.
Office Action of Chinese Application No. 201210241259.6, dated Sep. 23, 2016.
Official Action in JP2015-520805 dated Mar. 1, 2017.

* cited by examiner

OPERATION CONTROL METHOD FOR TOUCHSCREEN TERMINAL, AND MOBILE TERMINAL

TECHNICAL FIELD

The embodiments of the present document mainly relate to the field of mobile phone applications, and more particularly, to an operation control method for a touchscreen terminal and a mobile terminal.

BACKGROUND OF THE RELATED ART

Lock screen technology has already emerged during the popularity of key-phone terminal, and along with the growing popularity of touchscreen mobile terminals, types and implementation modes of the lock screen technology have been unprecedentedly enriched.

The unlocking method under the lock screen state of a touchscreen proposed by Apple is a common method currently used in mobile terminals to unlock the locked screen, and it is primarily to sweep the screen to unlock the mobile phone with a predetermined path or target. In addition, currently all the major mobile terminal companies have a wide range of layouts in the field of the screen unlock, especially a lot of technical schemes are put forward in the aspect of unlocking the mobile phone with touchscreen operations on the locked screen interface.

Existing locking and unlocking systems of the touchscreen are usually based on the following basis: if the user does not operate on the screen within a certain time period, the mobile terminal automatically enters into the black screen standby state, when the user tries to operate the mobile phone again in the black screen standby state, it first enters into the locked screen interface, and only when the locked screen interface is successfully unlocked, the mobile phone operation interface can be entered, and moreover, the functions of the mobile terminal can be used.

Most of technologies extended from this basis focus on what operations can be used to make the mobile terminal enter into the standby interface from the locked screen interface. While for the locked screen interface itself, there is no technical documentation to explore the value of its existence.

In essence, the existence of the locked screen interface blocks some of the users from obtaining some of the needed information in first time. For example, when a user plays a song in the background, a general locked screen interface does not display the name of the song; when the user does not need to operate, but only directly read message pushed by the operators in the standby interface (such as the DCD service launched by China Mobile), the locked screen interface blocks the user from accessing to the content in first time, and so on.

As described above, when the user does not need to perform certain operations, but only view the content in the specific standby interface, the existence of the locked screen interface makes the user have to carry out additional operations so as to read the needed information, which is somewhat redundant.

SUMMARY

To solve the technical problem, the embodiments of the present document provide an operation control method for a touchscreen terminal and a mobile terminal, to enable the user to obtain the same effect of preventing incorrect touch or operation as that of screen locking when using the mobile terminal.

To solve the abovementioned technical problem, an embodiment of the present document provides an operation control method for a touchscreen terminal, comprising:

a mobile terminal entering into an operation type locked state in a specified condition;

after the mobile terminal detects a specified type of operation, prohibiting any response to the specified type of operation.

The abovementioned method further has the following feature: the specified condition comprises any of the following conditions:

the mobile terminal does not receive any operation instruction in a specified time period;

the mobile terminal detects a specified event; and the mobile terminal receives an instruction of entering into the operation type locked state.

The abovementioned method further has the following feature:

the specified event comprises: an event that the mobile terminal is in an incoming call or in a call, or an event of receiving that a user lights up a screen from a black screen standby state.

The abovementioned method further has the following feature: after the step of the mobile terminal entering into the operation type locked state in the specified condition, the method further comprises:

the mobile terminal displaying a standby interface or an interface where the user's last operation stays.

The abovementioned method further has the following feature: the specified type of operation comprises one or more of the following:

screen single clicking, screen long pressing, key single clicking, and key long pressing.

The abovementioned method further has the following feature: after the mobile terminal enters into the operation type locked state in the specified condition, the method further comprises:

after the mobile terminal receives an instruction of releasing the operation type locked state, the mobile terminal exiting the operation type locked state.

The abovementioned method further has the following feature: the instruction of releasing the operation type locked state comprises:

unlocked operation instruction, or an operation instruction on a specified icon.

To solve the abovementioned problem, the embodiments of the present document further provides a mobile terminal, comprising:

a first module, configured to enter into an operation type locked state in a specified condition; and a second module, configured to, after detecting a specified type of operation, prohibit any response to the specified type of operation.

The abovementioned mobile terminal further has the following feature: the specified condition comprises any of the following conditions:

the mobile terminal does not receive any operation instruction in a specified time period;

the mobile terminal detects a specified event, and the specified event comprises: an event that the mobile terminal is in an incoming call or in a call, or an event that the user lights up a screen from a black screen standby state; and the mobile terminal receives an instruction of entering into the operation type locked state.

The abovementioned mobile terminal further has the following feature: the mobile terminal further comprises:

a third module, which is configured to, after the first module enters into the operation type locked state, display a standby interface or an interface where the user's last operation stays.

The abovementioned mobile terminal further has the following feature: the specified type of operation comprises one or more of the following:

screen single clicking, screen long pressing, key single clicking, and key long pressing.

The abovementioned mobile terminal further has the following feature: the mobile terminal further comprises:

a fourth module, which is configured to, after the first module enters into the operation type locked state, and after receiving an instruction of releasing the operation type locked state, exit the operation type locked state.

The abovementioned mobile terminal further has the following feature: the instruction of releasing the operation type locked state comprises:

an unlocked operation instruction, or an operation instruction on a specified icon.

In summary, the embodiments of the present document provide an operation control method for a touchscreen terminal and a mobile terminal thereof, to enable the user, when using the mobile terminal, to not only obtain the same effect of preventing incorrect touch or operation as that of screen locking, but also not to be blocked by an unnecessary locked screen interface when needing to read the contents in the standby interface, thus simplifying the user operation, and enhancing the operation experience of the mobile terminal.

PREFERRED EMBODIMENTS OF THE INVENTION

Hereinafter in conjunction with the accompanying drawings, the embodiments of the present document will be described in detail. It should be noted that, in the case of no conflict, the embodiments and features in the embodiments of the present application may be arbitrarily combined with each other.

Figure 1:
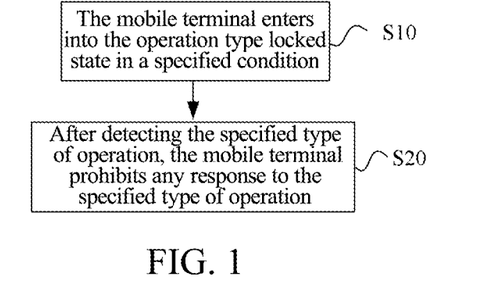
FIG. 1 is a flow chart of an operation control method for a touchscreen terminal in accordance with an embodiment of the present document.

FIG. 1 is a flow chart of an operation control method for a touchscreen terminal in accordance with an embodiment of the present document, and as shown in FIG. 1, it comprises the following steps:

S10, the mobile terminal enters into the operation type locked state in a specified condition;

S20, after the mobile terminal detects the specified type of operation, it prohibits any response to the specified type of operation.

The method of the present embodiment can lock certain specified types of operations without affecting the display of the current interface, so as to prevent users from mistakenly operating.

Wherein, the specified condition includes, but not limited to:

If the mobile terminal is not operated by the user in the specified time period, it enters into the operation type locked state;

the mobile terminal detects a specified event, for example, after detecting that the user lights up the screen from the black screen standby state in the black screen standby state, the mobile terminal enters into the operation type locked state. For another example, the mobile terminal is in an incoming call or a call, in order to prevent users from mistakenly touching the screen and hanging up the mobile phone, and the mobile phone enters into the operation type locked state.

The mobile terminal receives an instruction of entering into the operation type locked state, for example, the user manually controls the menu options of the mobile terminal to make it enter into the operation type locked state.

Wherein, after the mobile terminal enters into the operation type locked state, it further comprises the following features:

the interface display no longer displays the locked screen interface, but directly displays the standby interface or the interface where the user's last operation stays, so that the user can directly read the content in the interface without any unlocking operation.

Under the operation type locked state, some types of mobile phone operations will not be responded. Said some types of mobile phone operations are as follows: operations which may cause the user mistakenly performing unlocking such as screen single clicking, screen long pressing, key single clicking, and key long pressing in the case that the user touches or places his hands in the pocket.

Under the operation type locked state, the unlocked type of user operations will still normally be responded.

Preferably, after the mobile terminal receives the instruction of releasing the operation type locked state, it exits the operation type locked state.

The instruction of releasing the operation type locked state may comprise: unlocked operation instructions, or operation instructions on an specified icon, for example, when the user initiatively performs the unlocked operation (such as screen double clicking, key double clicking, and so on) on the interface elements in the operation type locked state, the mobile terminal can directly exit the operation type locked state, and returns to the normal state in which all operations are responded.

Generally, in order to prevent the incorrect operations produced by the user placing the mobile phone in the pocket in the operation type locked state in accordance with the embodiment of the present document, that is, by locking some of the operation types, the same purpose of preventing incorrect operations as that of screen locking can be achieved, in this state, the user operations which are prohibited from being responded can be screen single clicking, screen long pressing, key single clicking, key long pressing, and so on; the operations which can be responded can be screen double clicking, key combination, screen dragging, and so on. This is because, in general cases, single clicking and long pressing are more likely to happen in inadvertent touch, whereas double clicking, dragging, and key combinations are more likely to occur in the user purposeful operations. Of course, the user can freely set operations that are prohibited from being responded and operations that can be responded as needed.

With the method of locking some of operations in particular scenarios, the embodiment of the present document avoids the drawback that, by means of screen locking, the user must first unlock the screen with certain operations to visually read the contents displayed on the mobile phone, meanwhile, it is also able to achieve the same purpose of preventing incorrect operations as that of screen locking scheme.

With the method proposed in the embodiments of the present document, the user can use the unlocked operations to operate the application in the operation type locked state, thus reducing the operating steps of the user starting the application in the standby state, and having the effect of improving the user experience.

In the following, the case, in which the screen single clicking and the screen long pressing in the screen operations are prohibited from being responded, while the screen double clicking and the screen dragging can be responded, is taken for example to describe the subsequent embodiments. It should be stated that the operations which are prohibited from being responded and can be responded in the operation locked state in accordance with the embodiments of the present document have a variety of forms according to actual conditions or the development of the subsequent input mode, and they are not used for limitation.

Figure 2:
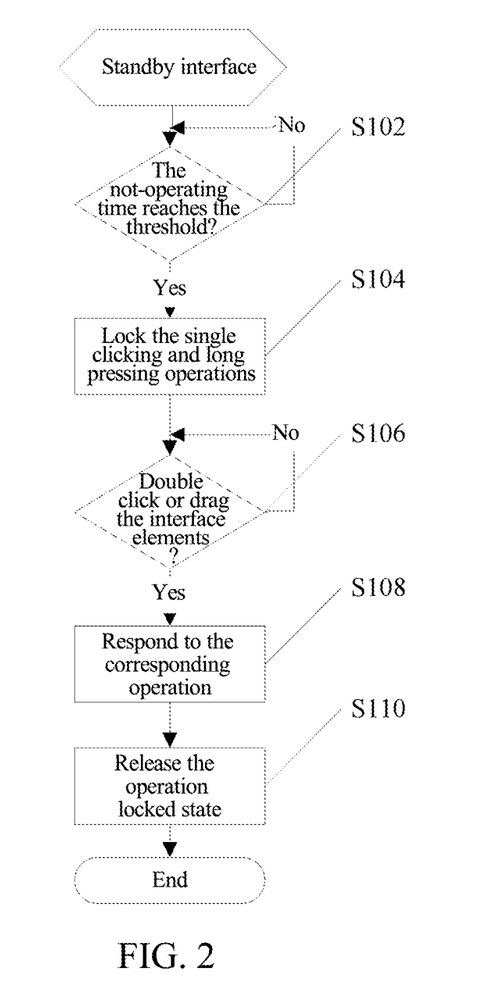
FIG. 2 is a flow chart of an operation control when a mobile phone is in the standby interface in accordance with a first embodiment of the present document.

FIG. 2 is a flow chart of operation control when the mobile phone is in the standby interface in accordance with the first embodiment of the present document, as shown in FIG. 2, it may comprise the following steps:

S102: it is to judge whether the user's not-operating time of the mobile phone reaches a predetermined threshold value or not.

S104: If the user's not-operating time reaches a threshold value, it is to enter into the operation locked state, and in this example, the locked state prohibits the operation of single clicking or long pressing.

S106: Thereafter, the mobile phone no longer responds to the operation of screen single clicking or long pressing, but continues to judge whether the user performs the double clicking or dragging operation on the interface elements or not.

S108: When the user performs double clicking or dragging operation on the interface elements, firstly, it is to respond to the user's corresponding operation according to the predetermined strategy, for example, the response to the dragging operation is to change the display position of the interface elements according to the end point of the dragging operation, and the response to the double clicking operation is to directly run the settings or application program corresponding to the interface elements.

S110: After responding to the user operation, it is to directly release the interface user operation locked state, and return to the normal state in which the single clicking and the long pressing can be responded.

During a voice call, there are often cases that the user pulls the mobile phone out of pocket when there is an incoming call, but answers or hangs up by mistake due to a touch by the finger on the screen, and in addition, during a call, there are cases that the user hangs up the call by mistake since the mobile phone is close to the face. The operation type locked state in accordance with the embodiment of the present document is equally applicable to such a scenario.

Figure 3:
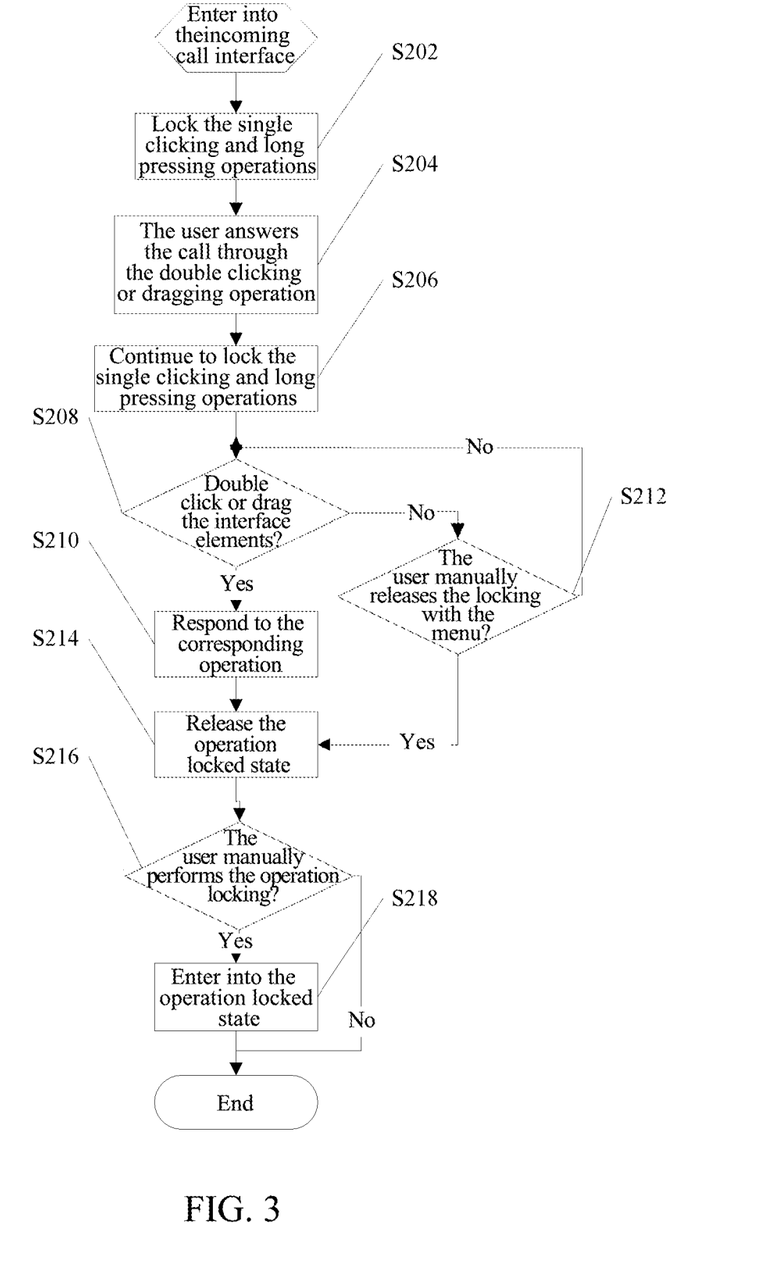
FIG. 3 is a flow chart of a mobile phone in the call interface in accordance with a second embodiment of the present document.

As shown in FIG. 3, it is a flow chart when the mobile phone is in the call interface in accordance with the second embodiment of the present document, and it may comprise the following steps:

S202: in the incoming call interface, in order to prevent the user from mistakenly operating, it is to automatically lock the single clicking and long pressing operations, and allow the user to operate for the incoming call only by the double clicking and dragging operations.

S204: When the user performs the double clicking or dragging operation, it is to enter into the call interface.

S206: In the call interface, it is to continue to lock the single clicking and long pressing operations to prevent the possible incorrect operations on the touch screen when the user places his/her face close to the phone screen during the call.

S208: In this operation locked state, it is to judge whether the user performs the double clicking or dragging operation on the interface elements or not.

S210: If the user performs the operation of double clicking or dragging the interface elements, the operation is responded in accordance with the predetermined strategy.

S214: The operation locked state is automatically released after responding to the operation.

S212: the option or the interface operation icon for switching on/off the operation locked state can be set in the menu, when the user performs operations on it, it is to directly enter into or release the operation locked state.

S216: when releasing the operation locked state, the user can manually enter into the operation locked state via the option or the interface operation icon described in the S212.

S218: if the user manually enters into the operation locked state, the call interface relocks some of the operations.

Figure 4:
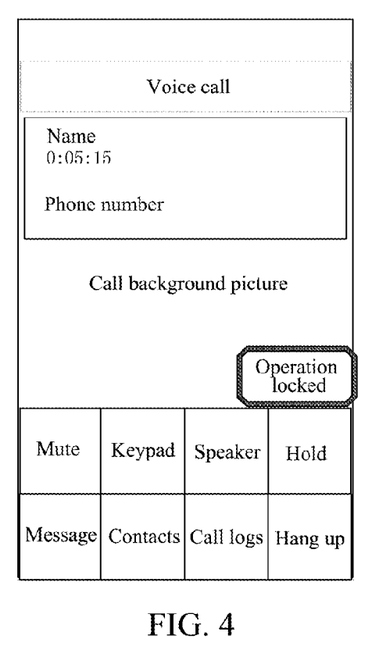
FIG. 4 is a schematic diagram of operations on different application menu interfaces of a mobile phone in accordance with an embodiment of the present document.

FIG. 4 is a schematic diagram of operations on different application menu interfaces of the mobile phone in accordance with an embodiment of the present document, FIG. 4 illustrates a call interface in the voice telephone, and in the call interface, an operation locked icon is added. When the mobile phone is in a voice call and is not in the operation locked state, the icon is displayed as "Operation Locking", at this point, when operating the icon, it is equivalent to that the mobile phone receives an instruction of entering into the operation type locked state, then the voice call interface enters into the operation locked state, only the unlocked operations such as double clicking or dragging are responded.

Accordingly, when entering into the operation locked state during a voice call, the corresponding icon can be displayed as "unlocking". At this time, when the operations to which the screen can respond are used to operate the "unlocking" icons (Of course, other icons can also be set and operated to achieve the effect of releasing the operation locked state), that is, the mobile phone receives the instruction of releasing the operation type locked state, it can make the screen return back to the state in which no operation is restricted.

This is a description for manual operation, if the user stays in the unlocked state for a certain length of time and does not carry out any operation; the voice call interface automatically enters into the operation locked state.

Figure 5:
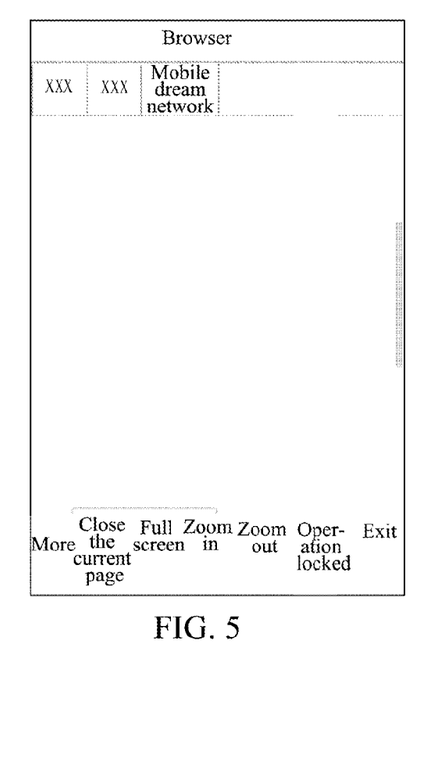
FIG. 5 is a schematic diagram of a browser interface in accordance with an embodiment of the present document.

FIG. 5 is a schematic diagram of a browser interface in accordance with an embodiment of the present document, as shown in FIG. 1, the "Operation Locking" icon is added in the browser menu, when the user actively clicks the icon, the browser enters into the operation locked state. Similar to the abovementioned example of the voice call interface, in the operation locked state, some of the operations of the browser are disabled, so as to prevent the users from mistakenly operating. Since it is similar to the case of the voice call interface, it is not described any more here.

Figure 6:
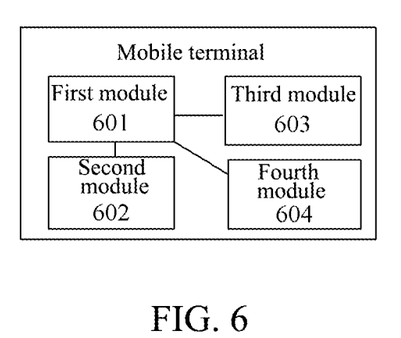
FIG. 6 is a schematic diagram of a mobile terminal in accordance with an embodiment of the present document.

FIG. 6 is a schematic diagram of a mobile terminal in accordance with an embodiment of the present document, as shown in FIG. 6, the mobile terminal of the present embodiment comprises:

a first module 601, which is configured to enter into an operation type locked state in a specified condition;

a second module 602, which is configured to, after detecting a specified type of operation, prohibit any response to the specified type of operation.

Wherein, the specified condition comprises any of the following conditions:

the mobile terminal does not receive any operation instruction in a specified time period;

the mobile terminal detects a specified event, and the specified event comprises: an event that the mobile terminal is in an incoming call or in a call, or an event that the user lights up a screen from a black screen standby state;

the mobile terminal receives an instruction of entering into the operation type locked state.

Wherein, the specified type of operation comprises one or more of the following:

screen single clicking, screen long pressing, key single clicking, and key long pressing.

In a preferred embodiment, the mobile terminal may further comprise:

a third module 603, which is configured to, after the first module 601 enters into the operation type locked state, display a standby screen or an interface where the user's final operation stays.

In a preferred embodiment, the mobile terminal may further comprise:

a fourth module 604, which is configured to, after the first module 601 enters into the operation type locked state, and after receiving an instruction of releasing the operation type locked state, exit the operation type locked state.

The instruction of releasing the operation type locked state may comprise: an unlocked operation instruction, or an operation instruction on a specified icon.

Those of ordinary skill in the art can understand that all or some of the steps in the abovementioned method may be implemented by a program instructing related hardware, and the program may be stored in a computer readable storage medium, such as read only memory, magnetic or optical disk. Alternatively, all or some of the steps in the abovementioned embodiments can also be implemented with one or more integrated circuits. Accordingly, each module/unit in the abovementioned embodiments may be implemented in the form of hardware and software functional modules. The embodiments of the present document are not limited to any particular form of combinations of hardware and software.

The above description is only for preferred embodiments of the present document, and of course, the present document may also have a variety of other embodiments, without departing from the spirit and essence of the invention, a person skilled in the art can make various changes and deformations according to the present document, and these corresponding changes and deformations should be within the protection scope of the appended claims of the present document.

INDUSTRIAL APPLICABILITY

The embodiments of the present document provide an operation control method for a touchscreen terminal and a mobile terminal thereof, to enable the user, when using the mobile terminal, to not only obtain the same effect of preventing incorrect touch or operation as that of screen locking, but also not to be blocked by an unnecessary locked screen interface when needing to read the contents in the standby interface, thus simplifying the user operation, and enhancing the operation experience of the mobile terminal.

What is claimed is:

1. An operation control method for a touchscreen terminal, comprising:
    a mobile terminal entering into an operation type locked state in a specified condition;
    prohibiting any response if the mobile terminal detects a preset prohibited type of operation;
    responding if the mobile terminal detects a preset allowed type of operation comprising double clicking and screen dragging; and
    automatically releasing the operation type locked state after responding to the preset allowed type of operation;
    wherein, wherein the specified condition comprises: the mobile terminal being in an incoming call or in a call,
    if the mobile terminal is in the incoming call or in the call, and the mobile terminal is not in the operation type locked state, displaying an icon as "Operation Locking" which makes the mobile terminal to enter into the operation type locked state when being operated;
    if the mobile terminal is in the operation type locked state during a voice call, displaying an icon as "unlocking" which makes the mobile terminal unlocked when being operated.

2. The method of claim 1, wherein the specified condition comprises any of the following conditions:
    the mobile terminal does not receive any operation instruction in a specified time period; and
    the mobile terminal receives an instruction of entering into the operation type locked state.

3. The method of claim 1, wherein after the step of the mobile terminal entering into an operation type locked state in a specified condition, the method further comprises:
    the mobile terminal displaying a standby interface or an interface where the user's last operation stays.

4. The method of claim 1, wherein the preset prohibited type of operation comprises one or more of the following: screen single clicking, screen long pressing, key single clicking, and key long pressing.

5. The method of claim 1, wherein after the step of the mobile terminal entering into an operation type locked state in a specified condition, the method further comprises:
    after the mobile terminal receives an instruction of releasing the operation type locked state, the mobile terminal exiting the operation type locked state.

6. A mobile terminal, comprising a processor and a memory containing a program that when executed by the processor causes the processor to:
    make the mobile terminal enter into an operation type locked state in a specified condition; and
    prohibit any response if the mobile terminal detects a preset prohibited type of operation, and respond if the mobile terminal detects a preset allowed type of operation comprising: double clicking and screen dragging; and automatically release the operation type locked state after responding to the preset allowed type of operation;

wherein the specified condition comprises:
detecting a specified event, and the specified event comprises: an event that the mobile terminal is in an incoming call or in a call;
the processor is made to,
if the mobile terminal is in the incoming call or in the call and the mobile terminal is not in the operation type locked state, run application menu interfaces comprising an operation locked icon displayed as "Operation Locking", receive the instruction of entering into the operation type locked state when the operation locked icon is operated, and then make the mobile terminal enter into the operation type locked state; and
if the mobile terminal is in the operation type locked state during a voice call, release the operation type locked state when an operation is performed on the operation locked icon which has changed to be displayed as "unlocking" in the operation type locked state.

7. The mobile terminal of claim 6, wherein the specified condition comprises any of the following conditions:
the mobile terminal does not receive any operation instruction in a specified time period; and
the mobile terminal receives an instruction of entering into the operation type locked state.

8. The mobile terminal of claim 6, wherein the processor is also caused to, after the mobile terminal enters into the operation type locked state, display a standby interface or an interface where the user's last operation stays.

9. The mobile terminal of claim 6, wherein the preset prohibited type of operation comprises one or more of the following: screen single clicking, screen long pressing, key single clicking, and key long pressing.

10. The mobile terminal of claim 6, wherein the processor is also caused to, after the mobile terminal enters into the operation type locked state, and after receiving an instruction of releasing the operation type locked state, exit the operation type locked state.

* * * * *